United States Patent [19]
Verbunt

[11] Patent Number: 4,713,297
[45] Date of Patent: Dec. 15, 1987

[54] LAMELLAR MAGNETIC CORE UTILIZING LOW VISCOSITY EPOXY ADHESIVE

[75] Inventor: Johannes P. M. Verbunt, Eindhoven, Netherlands

[73] Assignee: U.S. Philips Corporation, New York, N.Y.

[21] Appl. No.: 854,970

[22] Filed: Apr. 23, 1986

[30] Foreign Application Priority Data

May 24, 1985 [NL] Netherlands .......................... 8501491

[51] Int. Cl.$^4$ ........................ B32B 27/38; B32B 9/00; G11B 5/147
[52] U.S. Cl. .................................... 428/414; 428/692; 428/693; 428/900; 360/126; 360/127
[58] Field of Search ............... 428/414, 692, 693, 900; 360/126, 127

[56] References Cited

U.S. PATENT DOCUMENTS 4,079,430  3/1978  Fujishima et al. .................. 360/126

FOREIGN PATENT DOCUMENTS 58-12120  1/1983  Japan ................................... 360/126

Primary Examiner—John E. Kittle
Assistant Examiner—Susan S. Rucker
Attorney, Agent, or Firm—Norman N. Spain

[57] ABSTRACT

Magnetic core, suitable for use in a magnetic head or in a transformer. The magnetic core is composed of lamellar core parts of amorphous, ferromagnetic material coated with a thin film of an oxidic material chosen from the group comprising $SiO_2$, $Al_2O_3$, $TiO_2$ and $Si_3N_4$. The core parts are bonded together by means of an epoxy adhesive.

3 Claims, 4 Drawing Figures

LAMELLAR MAGNETIC CORE UTILIZING LOW VISCOSITY EPOXY ADHESIVE

BACKGROUND OF THE INVENTION

The invention relates to a magnetic core, comprising a first lamellar core part of amorphous, ferromagnetic material which is bonded by means of an epoxy adhesive to a second lamellar core part or to a substrate.

Magnetic cores having core parts of amorphous, ferromagnetic material are used, inter alia, in magnetic heads (particularly for video applications) and in transformers. When assembling the core parts to a core, one of the difficulties is to provide a satisfactory bond.

Glass is a frequently used bonding material in conventional magnetic heads. However, glass is not suitable in the present case, because its high processing temperature (higher than 300° C.) is detrimental to the magnetic properties of the amorphous, ferromagnetic metal of the core parts. To prevent deterioration, the bond must be realized in a temperature range below 200° C.

Epoxy compounds are frequently used as bonding agents for bonding metals. The epoxy compounds providing a satisfactory bond have, however, the drawback for the relevant application that they have a high viscosity. This high viscosity prevents the realization of very thin bonding layers. When lamellar cores of amorphous, ferromagnetic material are used in magnetic heads, it is important for the bonding layers between the lamellae to be as thin as possible (particularly thinner than 0.1 μm) in order to obtain an optimum possible writing efficiency. (The thicker the bonding layers are, the less magnetic material remains in the case of a given track width). However, in connection with eddy current losses they must ensure a satisfactory insulation between the core parts. In addition it is important for the bonding layer between head core and substrate to be as thin as possible. If the bonding layer is thick, there will sooner be problems when grinding a tape contact face profile on the head. Chamfers may be produced both on the substrate and on the head core, resulting in spacing losses and/or efficiency losses.

There exist epoxy compounds having a low viscosity and thus providing the possibility of a thin bonding layer. These epoxy compounds have, however, the drawback that they do not satisfactorily bond to an amorphous, ferromagnetic material surface.

BRIEF SUMMARY OF THE INVENTION

The invention provides a solution to the above-mentioned problems. This solution is characterized in that the surfaces of the lamellar core parts of amorphous, ferromagnetic material are coated with a film of a material chosen from the group comprising $TiO_2$, $SiO_2$, $Al_2O_3$ and $Si_3N_4$.

An advantage of $Si_3N_4$ is that it can be sputtered very thinly and yet constitutes a closed film. Coating the lamellae with a thin film of one of these materials enables the use of epoxy adhesives having a low viscosity, particularly a viscosity at room temperature of less than 1 Pa.S and even a viscosity at room temperature of less than 500 mPa.S, while yet a great bonding strength is obtained.

BRIEF DESCRIPTION OF THE DRAWING

In the invention.

DETAILED DESCRIPTION OF THE INVENTION

Figure 1:
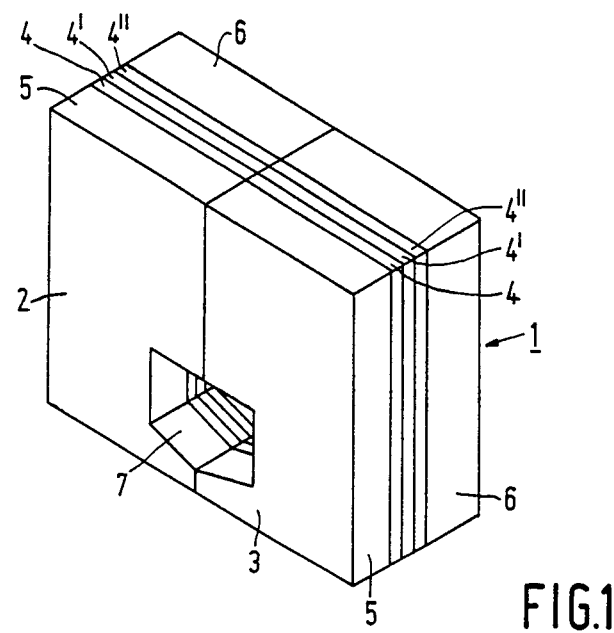
FIG. 1 is a perspective elevational view of a magnetic core for a magnetic head.

FIG. 1 shows an embodiment of a magnetic core 1 for a magnetic head. Magnetic core 1 is formed by two half cores 2, 3 which are bonded together. Each half core consists of three lamellar core parts 4, 4', 4" of amorphous, ferromagnetic metal having a thickness of approximately 7 μm, placed between two protective blocks 5, 6.

A material having the composition $Fe_5Co_{70}B_{10}Si_{15}$ is suitable, for example, as an amorphous, ferromagnetic material for the relevant magnetic cores, or more generally a material based on Fe Co Si B. Other amorphous magnetic materials applicable in magnetic head cores are, for example, materials based on Co Zr Mo Cr, based on Co Mn Si B and based on Co Nb Zr (for example, $Co_{18}Nb_{13}Zr_6$). The surfaces of the core parts 4, 4', 4" are coated with a film of $SiO_2$ applied by means of plasma deposition or sputtering and having a thickness of between 50 and 500 Å, and they are bonded (by heating at 130° C. for 1 hour) by means of an epoxy adhesive having a low viscosity, such as Epotek 330 to which 1 vol.% of a primer, such as α-glycidoxy-propyl-trimethoxy-silane has been added. Epotek 330 is the tradename for a 2-component thermohardening resin supplied by Epoxy Technology, Inc., where the first component is based on the diglycidylether of bisphenol A and the second component is an amine based curing agent. The viscosity at 24° C. in 375 mPa.S. Other epoxy adhesives with a low viscosity, such as Epotek 353 ND (also from Epoxy Technology Inc.) may equally well be used. An additional advantage of the use of an epoxy adhesive having a low viscosity as a bonding agent is that only a little pressure needs be exerted on the core parts during the bonding process (for example, several hundred grams per cm$^2$). A drawback of having to exert a high pressure (for example, several tens of kg/cm$^2$ as is required in glass cementing techniques) is that the core parts may be locally pressed together because they are frequently not too flat, causing short circuiting and an increase of the eddy current losses. The total thickness of the core part packets is approximately 22 μm. The space between the two half cores 2, 3 (the gap length) is 0.3 μm.

Figure 2:
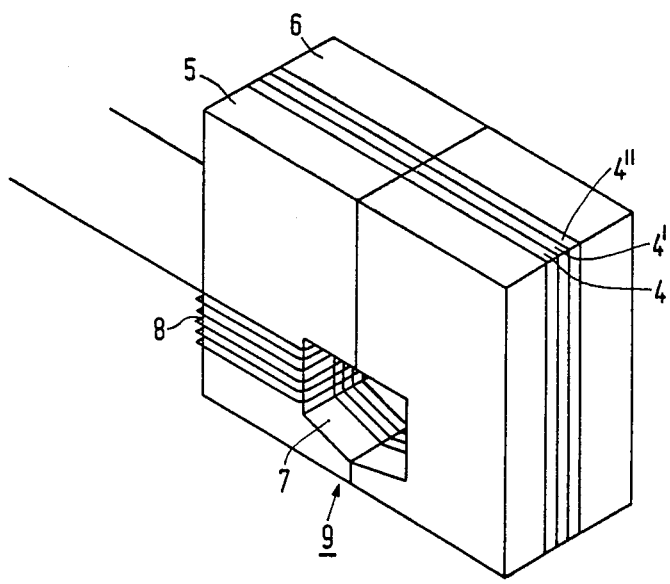
FIG. 2 is a perspective elevational view of a magnetic head in which the magnetic core of FIG. 1 is used.

The magnetic core 1 of FIG. 1 was formed into a magnetic head 9 (FIG. 2) by providing it with a winding 8 wound through a winding aperture 7. This head had a writing efficiency of 50%, a quality factor 4 at 5.4 MHz and a signal-to-noise ratio of 105 dB.

Figure 3:
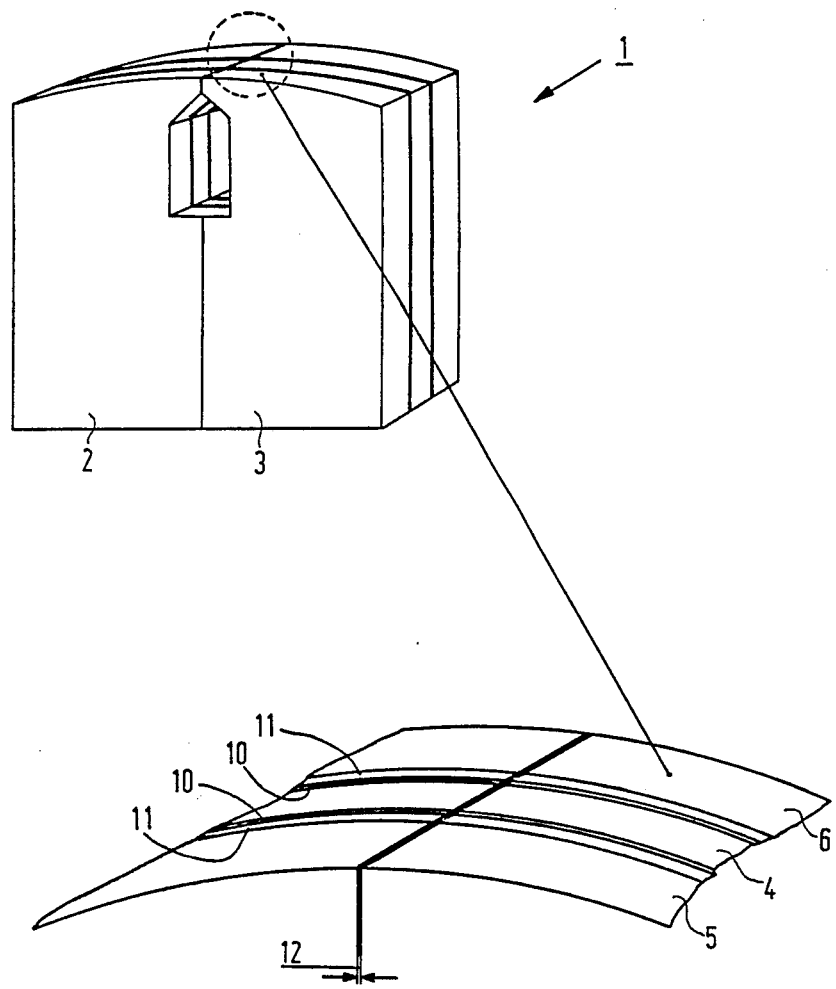
FIG. 3A is a perspective view of a magnetic core.
FIG. 3B is a cross-sectional view of the magnetic core shown in FIG. 3A showing in detail core parts covered with a thin film according to the invention.

FIG. 3A shows the magnetic core 1, consisting of two half cores 2, 3 which are bonded together. In detail as shown in FIG. 3B the core is shown to consist of a lamellar core part 4 of amorphous, ferromagnetic metal placed between two protective blocks 5, 6. The lamellar core part 4 is coated on both sides by layers 10 of $SiO_2$ and is bonded to the protective blocks 5, 6 by means of layers 11 of epoxy adhesives. The numeral 12 indicates the magnetic gap between the half cores.

In addition to other ceramic materials, a suitable material for the protective blocks 5, 6 is Macor ®, which is a mica filled glass ceramic material available from Corning Glass Works. The core parts 4, 4", may be bonded thereto with the aid of the same bonding agent as is used for their mutual bonding.

MnZn-ferrite is a suitable protective block material for specific applications. In that case it is favorable for the bonding strength if in addition to the core parts 4, 4" also the surface of the MnZn-ferrite protective block to be bonded is coated with an oxide film of $SiO_2$, $TiO_2$, $Al_2O_3$ or $Si_3N_4$.

When an $SiO_2$ film is used, the bonding strength of the epoxy bonding layer is found to be a factor of 10 higher than the bonding strength without the use of the $SiO_2$ film. In the case of $Al_2O_3$ the bonding strength is found to be a factor of 7 higher and in the case of $TiO_2$ it is found to be a factor of 5 higher. In all cases the bonding strength may be further increased by adding a silane to the epoxy adhesive.

The conditions under which the aforementioned films were sputtered on the surfaces of the core parts were as follows:

|         | Power | Pressure | Atmosphere         | Deposition rate |
|---------|-------|----------|--------------------|-----------------|
| $SiO_2$ | 350 W | 20 mTorr | argon              | 100 Å/min       |
| $Al_2O_3$ | 400 W | 10 mTorr | argon            | 40 Å/min        |
| $TiO_2$ | 300 W | 10 mTorr | argon + 1 mTorr $O_2$ | 40 Å/min    |

What is claimed is:

1. A magnetic core comprising a first lamellar core part of amorphous, ferromagnetic material bonded by means of epoxy adhesive to a second lamellar core part or to a substrate by means of an epoxy adhesive having a viscosity of less than 1 Pa.s at room temperature, the opposing surfaces of said lamellar core parts or said substrate being coated with a thin film of an inorganic material selected from the group consisting of $TiO_2$, $SiO_2$, $Al_2O_3$ and $Si_3N_4$.

2. The magnetic core of claim 1 wherein the epoxy adhesive contains a silane.

3. A magnetic core as claimed in claim 1, characterized in that the epoxy adhesive used has a viscosity of less than 500 mPa.S at room temperature.

* * * * *